United States Patent [19]

Gebhardt

[11] 4,291,796
[45] Sep. 29, 1981

[54] RETARDING CONVEYOR FOR CARGO

[76] Inventor: Elfriede Gebhardt, H. Thomastrasse 10, 6920 Sinsheim, Fed. Rep. of Germany

[21] Appl. No.: 30,923

[22] Filed: Apr. 17, 1979

[30] Foreign Application Priority Data

Dec. 12, 1978 [DE] Fed. Rep. of Germany ....... 2953483

[51] Int. Cl.³ .......................................... B65G 47/26
[52] U.S. Cl. .................................. 198/460; 198/572; 198/817; 198/781
[58] Field of Search ............... 198/460, 572, 575, 577, 198/781, 789–791, 857, 817

[56] References Cited

U.S. PATENT DOCUMENTS

| 3,066,788 | 12/1962 | Christiansen | 198/460 |
| 3,180,475 | 4/1965 | Del Rosso | 198/817 |
| 3,187,878 | 6/1965 | Harrison et al. | 198/572 |
| 3,447,701 | 6/1969 | Sause | 198/817 |
| 3,537,568 | 11/1970 | Leach | 198/781 |
| 4,121,709 | 10/1978 | Gebhardt | 198/781 |

FOREIGN PATENT DOCUMENTS

1481291 6/1974 Fed. Rep. of Germany ...... 198/781

*Primary Examiner*—Joseph E. Valenza
*Attorney, Agent, or Firm*—Craig and Antonelli

[57] ABSTRACT

A retarding conveyor for cargo such as pallets is disclosed. The conveyor is of the type which can be driven in sections by intermediate rollers, the latter being adjustable into a driving position or an idle position by feelers extending into the path of motion of the cargo. Respective sections of the conveyor comprise at least two parallel uninterrupted traction devices which are deflected at the ends of the section by guide wheels joined together for rotation, supports being provided on the conveyor for supporting the traction devices to carry the cargo and at least one of the guide wheels being driven by an intermediate roller.

1 Claim, 5 Drawing Figures

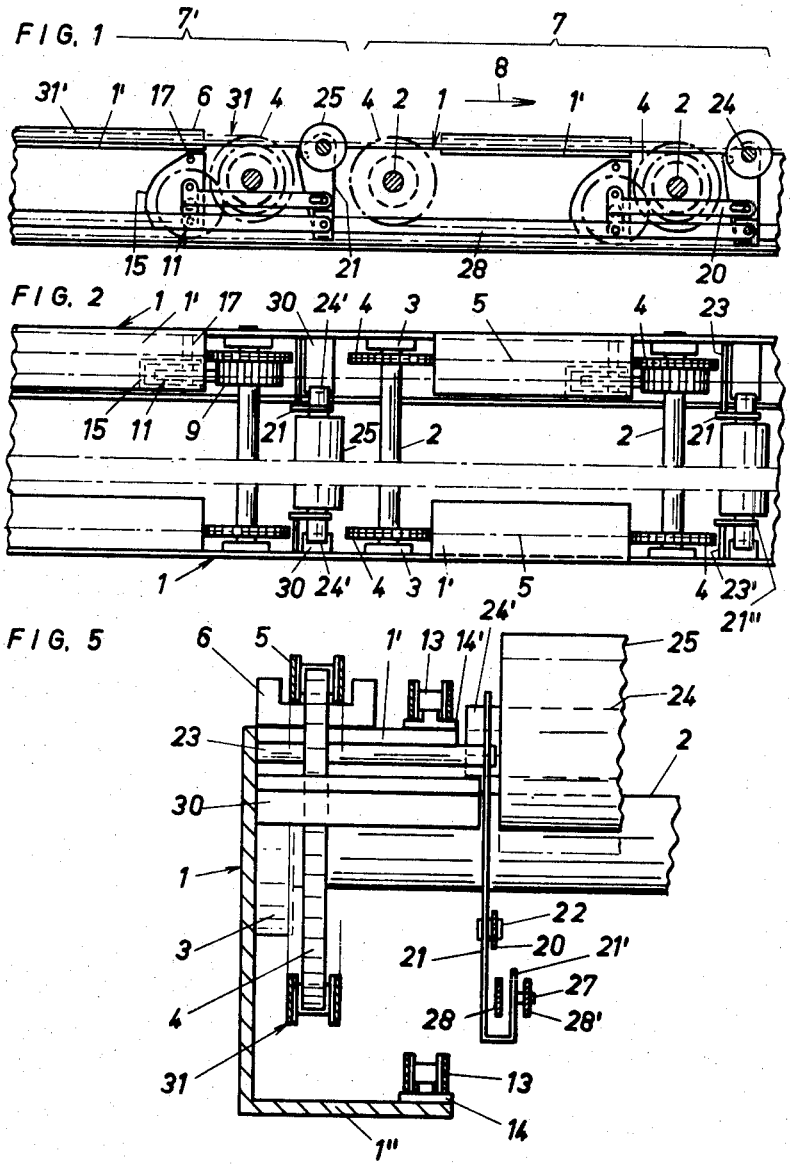

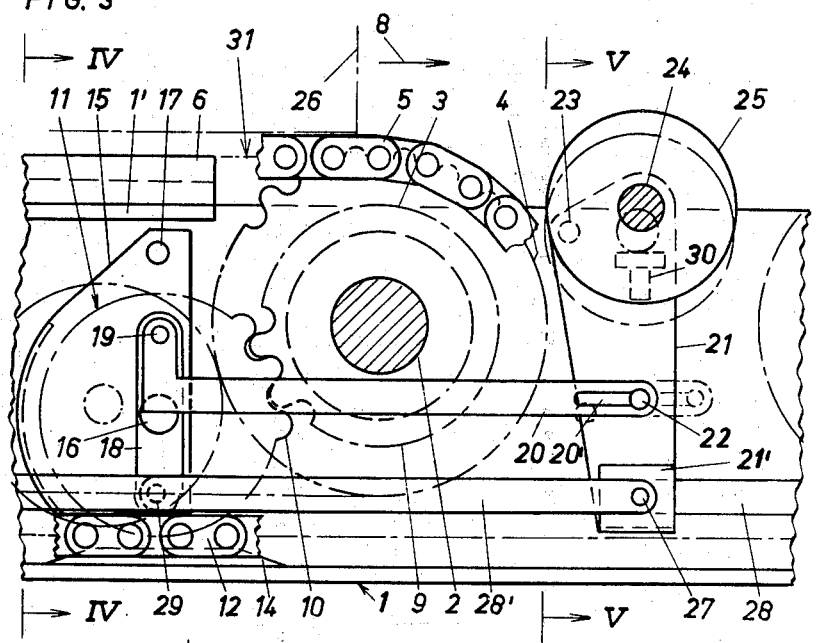
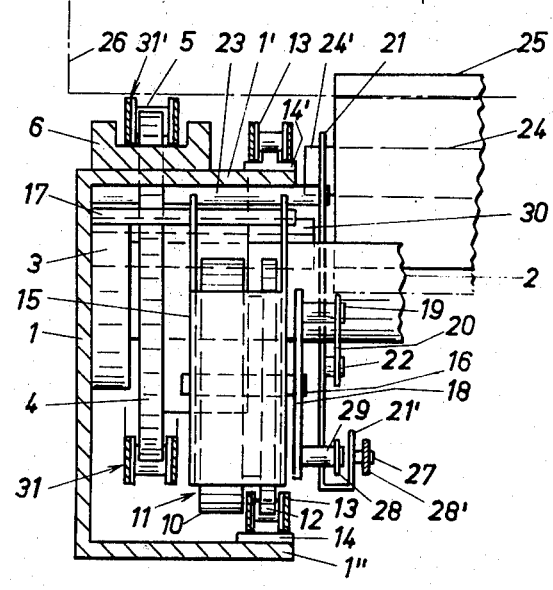

RETARDING CONVEYOR FOR CARGO

BACKGROUND AND SUMMARY OF THE INVENTION

The present invention relates to a retarding conveyor for cargo such as pallets, comprising a conveying means which can be driven in sections and carries the cargo, respective sections of the conveying means being driven by intermediate roller means driven by rotating drive means, the intermediate roller means being adjustable into a driving position or an idling position by feelers extending into the path of motion of the cargo.

According to DOS [German Unexamined Laid-Open Application] No. 2,517,015, a roller train for the conveying and stowing of cargo has been known wherein supporting rollers rotatable at right angles to the conveying direction are provided for the carrying and transporting of the cargo. Each supporting roller is associated with an intermediate roller, which latter connects, in the driving position, the supporting roller with the drive means and thus drives the supporting roller. The drive means is fashioned as a chain which is engaged by the intermediate roller with a sprocket wheel, while gear-like wheels can also be arranged for the drive transmission from the intermediate roller to the supporting roller. The intermediate rollers are joined into groups by an adjusting rail so that they can be placed into the driving position or into the idling position by the connected feeler. Thus, several supporting rollers and an identical number of intermediate rollers are provided in each section. Each of these rollers must be supported and/or arranged so that it is readily rotatable and maximally free of servicing or in need of only minimum servicing. Accordingly, for a stow roller train, a high number of such rollers is necessary, which render such a roller train relatively expensive. A stow roller train is also known from U.S. Pat. No. 3,066,788 wherein the supporting rollers of one section are driven in combination by one chain. Between the respective sections one intermediate roller is arranged which can be vertically adjusted, wherein the intermediate roller in the upper position assumes the driving position with contact on the first and last drive wheels of neighboring sections and in the lower position assumes the idling position. The intermediate rollers are constantly driven separately. Although in this stow roller train the number of intermediate rollers is reduced, the number of supporting rollers has been retained. Furthermore, the arrangement of the intermediate roller is unfavorable, since the adjusting force for adjusting the roller into the drive position must also include the contact pressure for producing the frictional connection between the intermediate roller and supporting rollers, i.e. a relatively high contact force is required. The conventional retarding conveyors are consequently voluminous in construction, expensive in servicing, and correspondingly costly in initial investment and upkeep.

Therefore, it is an object of the present invention to simplify a retarding conveyor while retaining the conventional high conveying and stowing volume.

This and the other objects of the present invention are attained by providing that respective sections on the conveying means in a retarding conveyor of the aforementioned type comprise at least two parallel, uninterrupted traction means, which are deflected at the ends of the section by guide wheels joined together for rotation, support means being provided on said conveyor for supporting said traction to carry cargo, and at least one of the guide wheels being driven by intermediate roller means.

An especially uniform movement of the cargo results in a further embodiment of the invention by arranging the feeler, which is fashioned as a pivotably supported roller, between two neighboring sections and by the fact that the feeler in its enforced idling position serves, due to its resting on abutments affixed to the frame, as a support for the cargo.

A high drive transmission is attained according to another feature of the invention by the fact that the traction means of the conveying means and the drive means are constructed as chains, and the intermediate roller, in addition to a sprocket wheel engaging into the drive means, also has a gear wheel which, in the driving position, meshes with a drive gear wheel connected for rotation with a guide wheel.

Advantages obtained by the present invention reside particularly in that the number of the supporting and driving rollers is greatly reduced. Each section requires, in this arrangement, merely the guide wheels for the chain hoists of the conveying means and only one intermediate roller to set the coupled together chain hoists into operation. With the reduced number of rollers, the possible error sources have likewise been drastically decreased. Thereby, such a retarding conveyor is simplified to a high degree as compared to the conventional retarding conveyers with respect to structure as well as function. On the other hand, by an adapted control of the sections, a close conveying sequence and stow density can be attained which correspond to those of the known stow roller trains. Since the chain hoists support the cargo along its entire length, a high acceleration is obtained in addition to a secure positioning of the cargo, and thus a high conveying speed results even at brief conveying periods. The retarding conveyor according to the present invention, therefore, not only represents a simplification of a retarding conveyor, but also offers, in addition to a lesser need for servicing, a high and thus economical exploitation of the stowing space as well as the driving energy.

These and other objects, features and advantages of the present invention will become more apparent from the following description when taken in connection with the accompanying drawings, which show, for purposes of illustration only, one embodiment in accordance with the present invention.

FIG. 1 is a side view of a longitudinal section through one embodiment of the retarding conveyor according to the present invention;

FIG. 2 is a top view of the retarding conveyor of FIG. 1;

FIG. 3 is a side view of the drive component on an enlarged scale;

FIG. 4 is a sectional view along line IV—IV in FIG. 3;

FIG. 5 is a sectional view along line V—V in FIG. 3.

DETAILED DESCRIPTION OF THE DRAWINGS

The retarding conveyor according to FIGS. 1 and 2 consists of two approximately horizontal, parallel, and U-shaped frames 1, the open sides of which are oriented toward each other. The top web 1' of these frames 1 is interrupted at regular intervals. At both ends of the web 1', i.e. in the zone of the opening between two adjacent webs 1', there is provided a shaft 2 which is rotatably supported at the frame 1 in bearings 3. Near both ends of a shaft 2 in the proximity of the bearings is connected guide wheel 4 for rotation with the shaft. The guide wheel 4 extends past the top web 1' in the upward direction. The respectively opposed guide wheels 4 are joined together by a traction means 31, for example an uninterrupted chain 5, preferably a roller chain, wherein the guide wheels are correspondingly fashioned as sprocket wheels. The traction means 31 serve as the conveying means for the cargo and slide and/or roll for this purpose with their upper side 31' on a profile-shaped support 6 made preferably from a synthetic resin and resting on the web 1'. The guide wheels 4 arranged in this way on both sides of a web 1' and joined together by the chains 5 constitute a section 7 or 7', the length of which can be adapted to the cargo to be transported. It can furthermore be seen that the four guide wheels 4 of one section 7 or 7' rotate synchronously due to the shafts 2 and the chains 5, so that a piece of cargo resting on the chains 5 is transported in parallel fashion in the conveying direction according to arrow 8, thus passing from one section 7' to the subsequent section 7 and so forth.

A driving gear wheel 9 is arranged for rotation on the shaft 2 at one of the two guide wheels 4 disposed in the front as seen in the conveying direction. A gear wheel 10 of an intermediate roller 11, arranged in front of the driving gear wheel in opposition to the transporting direction is associated with this driving gear wheel 9. The intermediate roller also comprises a sprocket wheel 12 connected to the gear wheel 10, this sprocket wheel meshing with a likewise continuous chain 13. This chain 13 represents a drive means extending over the entire length of the retarding conveyor and being constantly driven in the counterclockwise direction by means of a motor, not shown. The lower side of this chain 13 slides at least below the intermediate roller 11 in guide means 14 provided on the lower web 1" of the frame 1, whereas the returning side slides on corresponding guide means 14' on the top web 1'. The intermediate roller 11 is rotatably supported on an axle 16 in a U-shaped housing 15, the latter being pivotable, in turn, about a pin 17 arranged above the axle 16 and attached to the frame 1. The arrangement is such that, by pivoting the housing 15 about the pin 17, the gear wheel 10 can be brought into or out of engagement with the driving gear wheel 9.

A double lever 18 supported loosely on the axle 16 outside of the housing 15 serves for pivoting the intermediate roller 11. An adjusting rod 20 is articulated on a bolt 19 to the upper end of the double lever, this rod extending in the forward direction underneath the shaft 2 as seen in the conveying direction and ending in the open zone between neighboring sections 7 and 7' (FIG. 1). At that point, the rod has a slotted hole 20' into which extends a pin 22 attached to a lever 21. The lever 21 is pivotably mounted at the upper end to another pin 23, fixedly attached to the frame 1. An axle 24 provided laterally of the pin 23 is rigidly fastened to the lever 21. This axle 24 extends to the opposite frame 1 and is correspondingly pivotably mounted at that point to the frame 1 at a counter lever 21" about a pin 23' so that a parallel pivoting motion can be executed by this axle 24 about the pins 23 and 23' essentially at right angles to the frame 1. A roller 25 is rotatably arranged on the axle 24. In the position shown in FIG. 3 in solid lines the roller 25 extends into the path of a piece of cargo 26 resting on the chains 5 of the conveying means and is urged by this piece of cargo into the idling position downwardly, as shown in dot-dash lines. In this position, extensions 24' of the axle 24, which project toward the outside through the lever 21 or its counter lever 21", come to rest on abutments 30 attached to the frame 1, so that the cargo 26 can be supported by the roller 25. The roller 25 on the axle 24 and the lever 21 and its counter lever 21" constitute the feeler for controlling the intermediate roller 11.

The lever 21 has a U-shaped elbow 21' at its lower end. A control rod 28 is articulated to a pin 27 at the upwardly extending leg of the "U", this control rod extending to the double lever 18 of the intermediate roller 11 of the section 7' lying in front thereof as seen in opposition to the conveying direction. Thus, the control rod extends through the throat of the elbow 21' of lever 21 of section 7', as indicated with numeral 28 in FIGS. 4 and 5. At the double lever 18 of section 7', the control rod 28 is supported at the lower end on a pin 29. Correspondingly, the lever 21 of section 7' carries, articulated thereto, a control rod 28'.

If the feelers 21, 24, 25 are in the lifted position, the connected intermediate rollers 11 are in their driving position, and the chains 5 of the conveying means rotate in the clockwise direction and convey the cargo 26 resting thereon in the direction according to arrow 8. If, now, a roller 25 of the feeler 21, 24,25, for example of section 7, is pressed downwardly and held in this position, then the lever 21 is pivoted in the clockwise direction and pushes the control rod 28 toward the left in opposition to the conveying direction, as shown in FIGS. 1 and 3. The double lever 18 of section 7' connected at the end of the control rod 28 then pivots about the axle 16 in the clockwise direction, whereby the adjusting rod 20 is pushed toward the right in the conveying direction. During this step, the pin 22 of lever 21 of this section 7' arrives at the left-hand end of the slotted hole 20'. If another piece of cargo 26 also urges the roller 25 of the feeler of section 7' in the downward direction, then, by the pivoting of the lever 21 and by the pin 22 contacting the left-hand end of the slotted hole 20', the adjusting rod 20 is again pushed back in opposition to the conveying direction, during which step it tends to shift the double lever 18 in the counterclockwise direction. Since the lower pin 29 of the lever is blocked by the control rod 28, the double lever 18 pivots about this pin 29 and thus pivots the intermediate roller 11 into the idling position wherein it is out of engagement with the drive wheel 9. If the first-mentioned feeler of section 7 is released again, the control rod 28 moves in the transporting direction and the double lever 18 rotates about the pin 19 at the upper end, so that the gear wheel 10 of the intermediate roller 11 again meshes with the driving gear wheel 9. The section 7' is thus driven again, although the associated feeler is still depressed. It can furthermore be seen that the piece of cargo 26 during transition from one section to the subsequent one can rest on the roller 25 of the feeler, since the latter rests with its extensions 24' on the abutments 30.

Of course, instead of the aforedescribed shapemating force transmission by way of the gear and sprocket wheels, it is also possible to choose a frictional transmission, wherein the drive means can also be designed as a V-belt or the like. In a further development of this idea, the conveying means could also comprise, in place of the chain 5, a gear belt or a V-belt. Furthermore possible is the idea of driving the conveying means by two intermediate rollers 11, in order to distribute the driving force. Further, it is also possible to provide more than two rotating traction means to serve as the conveying means. Also, it can readily be seen that the present invention is not limited to the described retarding chain conveyor.

While we have shown and described only one embodiment in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

I claim:

1. In a retarding conveyor for cargo, such as pallets, comprising a conveying means which can be driven in sections and carries the cargo, respective sections of said conveying means being driven by intermediate roller means driven by rotating drive means, the intermediate roller means being adjustable into a driving position or an idling position by feelers extending into the path of motion of the cargo, the improvement comprising respective sections of the conveying means comprising at least two parallel, uninterrupted traction means in the form of chains which are deflected at the ends of the section by reversing sprocket wheels joined together for rotation by a shaft which is rotatably supported in a conveyor frame, support means being provided on said conveyor for supporting said chains to carry the cargo, the drive means being in the form of a chain and at least one of the reversing sprocket wheels being driven by said intermediate roller means which comprises an additional sprocket wheel continuously engaging the chain of the drive means and a gear wheel connected to said additional sprocket wheel and engaging in the driving position a driving gear wheel connected for rotation with a reversing sprocket wheel, said gear wheel being out of mesh with the driving gear wheel in the idling position, wherein said conveyor frame includes a laterally inwardly open, U-shaped frame member provided between the reversing sprocket wheels of a section, wherein said support means is a profile of a synthetic resin which is arranged on the top web of this frame member for supporting the traction means, and wherein the respective feelers comprise a pivotably supported roller which is arranged between two neighboring sections of the conveying means, the roller of the respective feelers is rotatably mounted about a rigid axle that is arranged at levers pivotable about pins, which latter are fixedly attached to the frame of the conveyor, the rigid axle extensions projecting laterally through the levers for engaging said abutment means affixed to the frame when the roller is in its enforced idling position whereby said pivotably supported roller can support cargo in its enforced idling position.

* * * * *